3,259,621

3-SUBSTITUTED-6-LOWER-ALKYL-10-METHYL-2H, 8H-PYRANO[3,2-g]-4,4-BENZOXAZINE-2,8 DIONES

Robert B. Moffett, Kalamazoo, Mich., assignor to The Upjohn Company, Kalamazoo, Mich., a corporation of Delaware
No Drawing. Filed Dec. 3, 1963, Ser. No. 327,801
4 Claims. (Cl. 260—244)

This invention relates to new chemical compounds and to a process for preparing the same and is particularly directed to 3-substituted-6-lower-alkyl-10-methyl-2H,8H-pyrano[3,2-g]-1,4-benzoxazine-2,8-diones and the preparation thereof.

The novel compounds of the invention have the following structural formula:

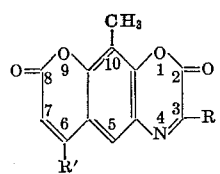

Formula I wherein R is a member selected from the group consisting of lower-alkyl, phenyl, and

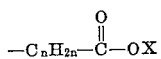

R' is lower-alkyl; X is lower-alky; and $n$ is an integer from 1 to 7, inclusive.

As used in the present specification and claims the term lower-alkyl is used to mean an alkyl group of from 1 to 8 carbon atoms inclusive, for example, methyl, ethyl, propyl, butyl, amyl, hexyl, heptyl and octyl and the isomeric forms thereof.

The novel compounds of the invention are prepared by condensing a 4-lower-alkyl-6-amino-7-hydroxy-8-methylcoumarin with an α-keto ester according to the following equation:

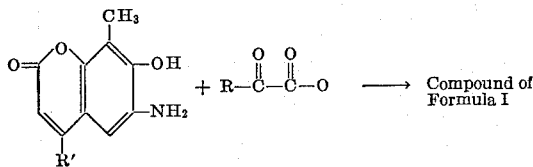

wherein R, R' and X are as defined above.

The condensation is accelerated by gentle heating (from room temperature, about 25° C., to about 180° C., the optimum temperature depending upon the nature of the R moiety) and advantageously is carried out in a non-oxidizing atmosphere, for example, nitrogen. The proportions of reactants can be varied over a wide range. Equimolar amounts are suitable though sometimes it is desirable to use an excess of one or the other reactant, say up to about 100 percent excess. An inert solvent, for example, toluene, ethanol, dioxane or tetrahydrofuran, can be used if desired or an excess of the α-keto ester, when it is liquid, can serve as inert solvent.

The novel compounds of the invention have tranquilizing and analgetic activity and can be used to calm agitated mammals or animals, e.g., laboratory rats and mice. For example, 3,6,10-trimethyl-2H,8H-pyrano[3,2-g]-1,4-benzoxazine-2,8-dione gives over 60 percent reduction of motor activity in mice when parenterally administered at doses as low as 10 percent of the $LD_{50}$. The $LD_{50}$ in mice is >1000 mg./kg.

The compounds of the invention are also useful for light filters, giving strong absorption bands in the vicinity of 213, 24, 302 and 362 millimicrons. For this purpose they can be used in solutions, suspensions, ointments, or they can be dispersed in plastic films.

The invention can be more fully understood by reference to the following examples which are given by way of illustration and not of limitation. Parts and percentages are by weight unless otherwise specified.

EXAMPLE 1.—3,6,10-TRIMETHYL-2H-8H-PYRANO [3,2-g]-1,4-BENZOXAZINE-2,8-DIONE

A slurry of 10.3 gm. (0.05 mole) of 6-amino-7-hydroxy-4,8-dimethylcoumarin [R. B. Moffett, J. Med. Pharm. Chem. 5, 335 (1962)] in 25 gm. of ethyl pyruvate was heated under nitrogen in an oil bath at 130–145° C. for 1 hour. The product was boiled with 100 ml. of ethanol and cooled, giving 6.25 gm. of yellow-brown solid, M.P. 226–235° C. (dec.). The solid was recrystallized from 85 ml. of n-butanol, giving 3.9 gm. of yellow solid, M.P. 234° C. (dec.). The yellow solid was dissolved in benzene, filtered, concentrated to dryness, and the solid residue was recrystallized from 15 ml. of dimethylformamide, giving 1.74 gm. of olive colored crystals of 3,6,10-trimethyl-2H,8H-pyrano[3,2-g]-1,4-benzoxazine-2,8-dione having a melting point of 253–256° C. (dec.). Infrared and ultraviolet spectra were in agreement with the proposed structure.

Anal.—Calcd. for $C_{14}H_{11}NO_4$: C, 65.36; H, 4.31; N, 5.45. Found: C, 65.04; H, 4.72; N, 5.54.

EXAMPLE 2.—3,6,10-TRIMETHYL-2H-8H-PYRANO [3,2-g]-1,4-BENZOXAZINE-2,8-DIONE

A mixture of 20.6 gm. (0.1 mole) of 6-amino-7-hydroxy-4,8-dimethylcoumarin and 20.4 gm. (0.2 mole) of methyl pyruvate was allowed to stand at room temperature under nitrogen for ½ hour. It became more fluid and then set solid. After warming on a steam bath for 1 hour the mixture was boiled with 85 ml. of ethanol and cooled. The solid was collected and dried, giving 23.8 gm. (96%) of bright yellow 3,6,10-trimethyl-2H-8H-pyrano[3,2-g]-1,4-benzoxazine-2,8-dione having a melting point of 260–264° C. A mixed melting point with the product of Example 1 showed no depression.

U.V. spectrum in EtOH

| λ max.: | ε |
|---|---|
| 213 | 26,800 |
| 242 | 17,750 |
| 302 | 7,000 |
| 362 | 7,950 |

Following the foregoing procedure, in place of 6-amino-7-hydroxy-4,8-dimethylcoumarin there can be substituted an equimolar amount each of 4-ethyl-6-amino-7-hydroxy-8-methylcoumarin, 4-propyl-6-amino-7-hydroxy-8-methylcoumarin, 4-butyl-6-amino-7-hydroxy-8-methylcoumarin, 4-amyl-6-amino-7-hydroxy-8-methylcoumarin, and 4-octyl-6-amino-7-hydroxy-8-methylcoumarin. There can thus be obtained the corresponding 6-alkyl-3,10-dimethyl-2H,8H-pyrano[3,2-g]-1,4-benzoxazine-2,8-diones.

EXAMPLE 3.—6,10-DIMETHYL-3-PHENYL-2H,8H-PYRANO[3,2-g]-1,4-BENZOXAZINE-2,8-DIONE

A mixture of 20.6 gm. (0.1 mole) of 6-amino-7-hydroxy-4,8-dimethylcoumarin and 17.8 gm. (0.1 mole) of ethyl phenylglyoxylate was heated under nitrogen in an oil bath at 175° C. for 2½ hours. There was little change in the appearance of the solid during heating. The mixture was well mixed with pentane and dilute hydrochloric acid and filtered. The solid was washed with water and dried, giving 13.6 gm. of yellow-brown solid having a melting point of about 249° C. The yellow-brown solid was recrystallized from dimethylformamide, giving 11.9 gm. of olive colored crystals of 6,10-dimethyl - 3-phenyl-2H,8H-pyrano[3,2-g]-1,4-benzoxazine-2,8-dione having a melting point of 255–256° C. The infrared and ultraviolet spectra were in accordance with the proposed structure.

*Anal.*—Calcd. for $C_{19}H_{13}NO_4$: C, 71.47; H, 4.10; N, 4.39. Found: C, 71.21; H, 4.07; N, 4.34.

Following the foregoing procedure, in place of ethyl phenylglyoxylate there can be substituted an equilmolar amount each of methyl ethylglyoxylate, methyl propylglyoxylate, methyl amylglyoxylate, and methl octylglyoxylate. There can thus be obtained the corresponding 3 - alkyl - 6,10 - dimethyl-2H,8H-pyrano[3.2-g]-1,4-benzoxazine-2,8-diones.

EXAMPLE 4.—3-CARBETHOXYMETHYL-6,10-DIMETHYL - 2H,8H - PYRANO[3,2-g] - 1,4-BENZOXAZINE-2,8-DIONE

A mixture of 20.6 gm. (0.1 mole) of 6-amino-7-hydroxy-4,8-dimethylcoumarin and 33.6 gm. (0.18 mole) of diethyl oxal-acetate was allowed to stand at room temperature under nitrogen for 2 hours. It became fluid (but did not all dissolve) and then set solid. After warming on a steam bath for 1 hour, the mixture was boiled with ethanol, cooled, and filtered, giving 31 gm. of yellow solid, M.P. 231–235° C. This was recrystallized from dimethylformamide, giving 24.6 gm. (75%) of 3-carbethoxymethyl-6,10-dimethyl-2H,8H-pyrano[3,2-g]-1,4-benzoxazine-2,8-dione as a yellow solid, M.P. 240–242.5° C.

*Anal.*—Calcd. for $C_{17}H_{15}NO_6$: C, 62.00; H, 4.59; N, 4.25; O, 29.15. Found: C, 62.07; H, 4.55; N, 4.60; O, 28.97.

*U.V. spectrum in EtOH*

| λ max.: | ε |
|---|---|
| 211 | 24,800 |
| 243 | 16,900 |
| 298 | 7,700 |
| 361 | 8,900 |

Following the foregoing procedure, in place of diethyl oxalacetate there can be substituted an equimolar amount of other di-lower-alkyl esters of oxalacetic acid, e.g., the methyl, propyl, isopropyl, butyl, sec-butyl, amyl, isoamyl, heptyl, 2-ethylhexyl, and octyl esters to give the corresponding 3 - carbalkoxymethyl - 6,10-dimethyl-2H,8H-pyrano[3,2-g]-1,4-benzoxazine-2,8-dione.

In like manner, the above oxalacetic acid esters can be replaced by the corresponding esters of methyloxalacetic acid, dimethyloxalacetic acid, ethylmethyloxalacetic acid, and α-ketoglutaric, α-ketoadipic, α-ketopimelic, α-ketosuberic, α-ketoazelaic and α-ketosebacic acids. There can thus be obtained the corresponding 3-carbalkoxyalkyl - 6,10-dimethyl-2H,8H-pyrano[3,2-g]-1,4-benzoxazine-2,8-diones.

What is claimed is:

1. A compound of the formula

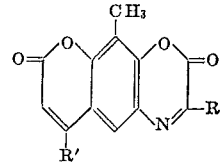

wherein R is a member selected from the group consisting of lower-alkyl, phenyl and

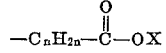

R' is lower-alkyl; X is lower-alkyl; and *n* is an integer from 1 to 7, inclusive.

2. 3,6,10 - trimethyl - 2H,8H-pyrano[3,2-g]-1,4-benzoxazine-2,8-dione.

3. 6,10 - dimethyl - 3-phenyl-2H,8H-pyrano[3,2-g]-1,4-benzoxazine-2,8-dione.

4. 3 - carbethoxymethyl-6,10-dimethyl-2H,8H-pyrano [3,2-g]-1,4-benzoxazine-2,8-dione.

References Cited by the Examiner

UNITED STATES PATENTS 3,105,071    9/1963    Moffett _____ 260—244

FOREIGN PATENTS 815,279    6/1959    Great Britain.

WALTER A. MODANCE, *Primary Examiner.*

R. T. BOND, *Assistant Examiner.*